May 11, 1965  J. C. GUILD ETAL  3,183,164
LIQUID MODERATED NUCLEAR REACTORS
Filed Nov. 23, 1960  4 Sheets-Sheet 1

FIG. I

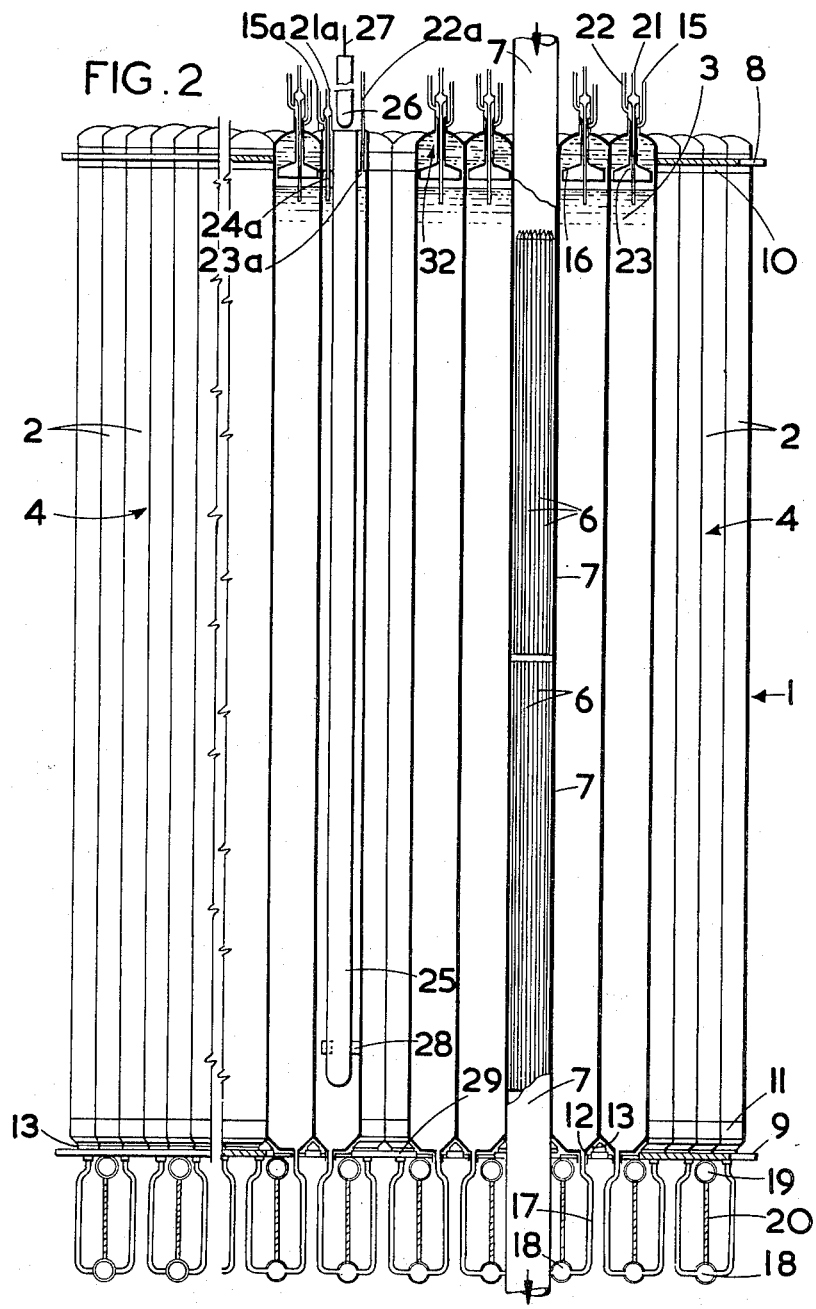

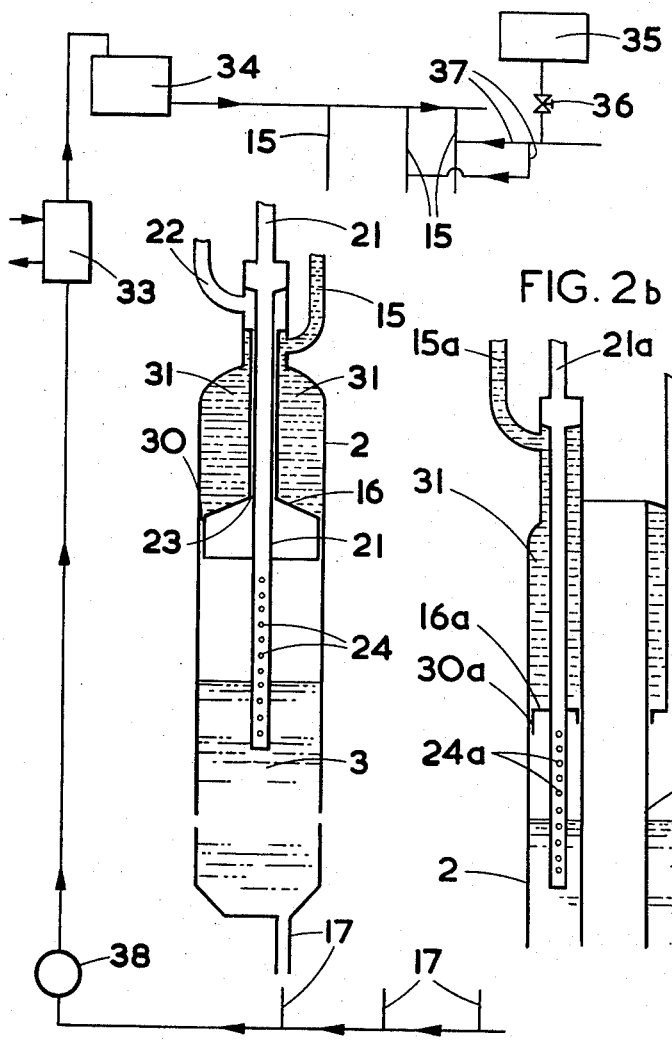

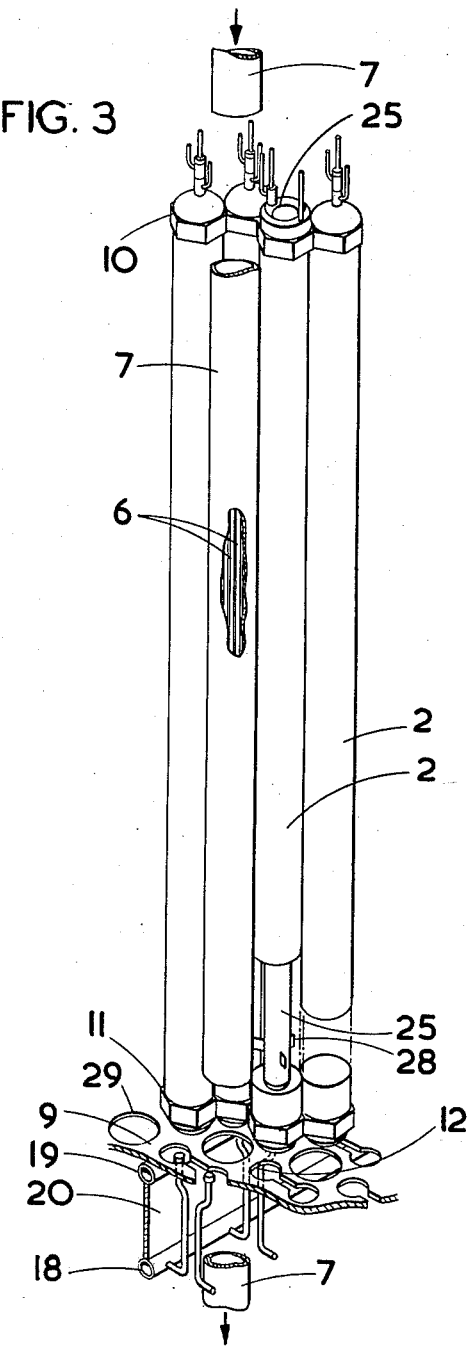

United States Patent Office

3,183,164
Patented May 11, 1965

3,183,164
LIQUID MODERATED NUCLEAR REACTORS
James Carrie Guild, North Ashton, near Wigan, and Leslie Joseph Castle, Wantage, England, assignors to United Kingdom Atomic Energy Authority, London, England
Filed Nov. 23, 1960, Ser. No. 71,186
Claims priority, application Great Britain, Nov. 26, 1959, 40,174/59
5 Claims. (Cl. 176—37)

This invention relates to liquid moderated reactors.

One customary design of liquid moderated reactor has a containment vessel for the moderator comprising a closed tank, the tank being penetrated by a number of tubes. This tank and tube arrangement is commonly referred to as a "calandria." Where the coolant is pressurised, tubular channels for fuel elements and coolant are provided inside the calandria tubes. The tubular channels are made robust to withstand the operating pressure and the calandria tubes can then be made as thin as is practicable having in mind that they are stressed mechanically by the head of moderator liquid and by thermal stresses coming upon them in the course of operation of the reactor but are not stressed by the reactor coolant. The thermal stresses can be very large unless expansion seals are made between the calandria tank and the calandria tubes and even seals can give rise to substantial stresses. The tubes are therefore made of a thickness which is greater than that required by the mere barrier function which at first appears to be their only function. As these tubes exist in the core of the reactor, any increase in thickness invokes a penalty of increased neutron absorption and hence increased fuel enrichment and increased fuel costs. In addition, the expansion seals, necessarily located in places difficult of access and difficult to maintain, are not desirable although apparently essential. One further point arises from current calandria design for nuclear reactors. The calandria tank is conventionally cylindrical and the calandria tubes are planned on a square or triangular lattice thus giving an irregular outline of tubes in a smoothly outlined tank. This requires an investment of moderator (expensive when it is $D_2O$) in excess of that required solely for nuclear reasons.

Hence, it becomes an object of this invention to provide a liquid moderated nuclear reactor which shows core structure features improved in relation to those discussed above.

According to the invention, a nuclear reactor comprises a close-packed nest of vertically orientated tubes arranged so that the outer walls of the tubes define a lattice of voids extending through the nest, tubular coolant-conducting channels disposed lengthwise in the voids, nuclear fuel in the channels and liquid moderator in the tubes.

An embodiment of the invention will now be described by way of example, with reference to the accompanying drawings wherein:

FIGURE 1 is a fragmental plan view, partly diagrammatic.

FIGURE 2 is a part-sectional elevation, taken on the lines II—II of FIGURE 1.

FIGURE 2A is an enlarged detail of FIGURE 2 with a diagrammatic addition.

FIGURE 2B is a further enlarged detail of FIGURE 2, and

FIGURE 3 is a fragmental view in perspective.

Referring to the figures, a heavy water-moderated nuclear reactor core structure 1 comprises a close-packed nest 4 of vertically orientated tubes 2 containing the moderator 3, the outer walls of the tubes 2 defining a lattice of voids 5 for the accommodation of tubular channels 7 (only one being shown, for clarity) containing fuel elements 6. The tubes 2 are maintained in the nest 4 by upper and lower support and location plates 8 and 9 respectively.

In greater detail, the tubes 2 have upper and lower hexagonal ends 10 and 11 respectively, the remainder of each tube 2 being of circular cross-section. Adjacent tubes 2 touch each other at their ends 10, 11 only. The lower support plate 9 is perforated by holes 12 for locating spigots 13 on the bottoms of the tubes 2 and holes 29 for the accommodation of the fuel element channels 7. The upper support plate 8 has a central cut-away section 14 for locating the tube nest 4 about the hexagonal ends 10 of the peripheral tubes 2 forming the nest.

The coolant employed for the reactor is steam, the steam passing down through the channels 7 to remove heat from the fuel elements 6 contained therein before passage through an external heat exchanger to give up this heat in the generation of further steam.

A fraction of the moderator is cooled during operation of the reactor by circulation by a pump 38 through an external heat exchanger 33 (shown diagrammatically in FIGURE 2A) and is passed from the heat exchanger to enter a header tank 34 and from thence to the bulk of moderator remaining in the tubes 2. Moderator is returned to the tubes 2 through inlets 15 where it is distributed over the upper walls of each tube 2 in a thin annular stream by a baffle 16 of annular form, the outer periphery of which has a small clearance 30 from the inner walls of the tube 2. The upper ends of the tubes 2, which are subjected to both gamma and thermal radiation from the fuel elements 6 are thus kept cool by inflowing moderator. The small clearance 30 causes a column of moderator 31 to be retained above each baffle 16. The columns 31 of moderator in the upper ends of each of the close-packed tubes 2 combine to provide a neutron reflector 32 above the bulk of moderator 3 retained in the remainder of each of the tubes. The moderator leaves the tubes 2 by way of outlets 17 (FIGURE 2) in the tube bottoms, the outlets 17 being connected to a series of tubular headers 18 connected in turn to the heat exchangers 33. The headers 18 are spaced from tubular supports 19 by web plates 20, the headers 18, supports 19 and web plates 20 combining to provide support beams beneath the lower support plate 9. The tubular supports 19 could also be employed as headers for moderator if required.

Irradiation of the heavy water moderator during operation of reactor results in the formation of radiolytic decomposition gases at the surface of the moderator. These gases, which are explosive, are purged from the surface of the moderator by a "blanket" of helium gas, the helium entering the upper end of the tubes 2 through inlet pipes 21 and leaving by way of outlet pipes 22 and annular passages 23 between the inlets 21 and baffles 16. The helium is then passed through external plant to remove the explosive gases before returning to the inlets 21 of the tubes 2.

Control of the reactor under normal operating conditions is affected in the conventional manner by varying the level of the moderator within the tubes 2 and thus the quantity of moderator present in the reactor core. This is effected by varying the speed of the pump 38. To ensure an outflow of helium adjacent the surface of the moderator 3 regardless of its level (within control level limits), the helium inlets 21 are perforated by a series of apertures 24 along a portion adjacent the level of moderator (that is to say the lower ends of the inlets 21) in the tubes 2.

The reactor may be adapted for shut down in an emergency by dumping of the moderator from the headers 18 in the manner disclosed, for example, by Paper No. P/209, delivered at the Second United Nations International Conference on the Peaceful Uses of Atomic Energy, Geneva, 1958, wherein this system of shut down was described with relation to the Canadian N.P.D. Reactor. The preferred method of emergency shutdown however for the present reactor is by insertion of neutron-absorbing rods into the reactor core. It will be seen from the figures that certain of the tubes 2 contain inner blinded-ended tubes 25, supported therein by struts 28, the annular space between the tubes 2 and 25 being filled by moderator 3. Neutron-absorbing rods 26 suspended above the tubes 25 by cables 27 are dropped into the tubes 25 when it is required to shut down the reactor quickly. The rods 26 may also be used for normal control of the reactor instead of, or in conjunction with, variation of the level of moderator in the reactor core.

The tubes 2 containing the tubes 25 have inlets 15a (FIGURE 2b) for moderator, and also have helium inlets and outlets 21a, 22a respectively. Baffles 16a distribute inflowing moderator over the upper walls of both the tubes 2 and the tubes 25. The inlets 15a are penetrated by apertures 24a. The baffles 16a retain moderator in columns 31a to form part of the neutron reflector 32.

As the moderator is housed within the tubes 2, these tubes are subjected to a tensile hoop loading which allows a thinner tube to be used than one under a compressive hoop loading as in the calandria arrangement. As less tube material is employed for a given hydro-static head of moderator, the reactor can operate with nuclear fuel of correspondingly less enrichment.

The tubes 2 can expand individually within the upper support plate 8, no restraint being offered to axial movement of the tubes.

Tubes 2 can be added or removed from the tube nest 4 so that the size or shape of the reactor core may be varied if required.

The invention also allows a reduced volume of moderator (compared with the calandria arrangement) which results in reduced capital costs. It will also be obvious to those skilled in the art that the invention allows other liquid (or fluid) moderators to be used instead of heavy water as described above. Reactors constructed according to the invention are particularly suitable for the reactor control and shut down system known as "poisoning," wherein a neutron-absorbing liquid is inserted into the moderator to control reactivity. In the conventional calandria arrangement, "poisons" are inserted into the moderator-containing tank in regions of high neutron flux, e.g. adjacent the tubes containing the fuel elements. Unfortunately, these "poisons" do not remain in the vicinity of the high neutron flux but spread rapidly throughout the liquid moderator.

With the present invention however, it is possible to insert liquid "poisons" into selected tubes 2, for example those tubes immediately adjacent the fuel element channels 7. A "poison" is thus confined to the selected tubes and isolated from the remainder of the moderator. The preferred poison is boric acid and this is inserted into selected groups of tubes 2 through a control valve 36 and discharge lines 37 connected to a header tank 35 located above the upper end of the tubes (FIGURE 2). The boric acid may later be extracted during the external circulation of the moderator by suitable plant.

We claim:

1. A nuclear reactor comprising: a nest of close-spaced tubes disposed upright in parallel array and arranged in first and second groups, the first group comprising a relatively large number of tubes and the second group comprising a relatively small number of tubes, the tubes of the second group being distributed over the nest and separated from each other by tubes of the first group, nuclear fuel in the tubes of the second group only, a mass of liquid moderator in each of the tubes of the first group, and means causing a flow of reactor coolant to pass through each of the tubes of the second group and in heat exchange with said nuclear fuel.

2. A nuclear reactor comprising: a nest of close spaced tubes disposed upright in parallel array and arranged in first and second groups, the first group comprising a relatively large number of tubes and the second group comprising a relatively small number of tubes, the tubes of the second group being distributed over the nest and separated from each other by tubes of the first group, nuclear fuel in the tubes of the second group only, a mass of liquid moderator in each of the tubes of the first group, means causing a flow of reactor coolant to pass along each of the tubes of the second group and in heat exchange with said nuclear fuel, cooling apparatus disposed outside the tube nest, baffle means disposed laterally above the mass of moderator in each tube of the first group and defining with an upper portion of the inner wall of said tube an annular channel in said tube, an outlet connection at the lower end of said tube, an inlet connection at the upper end of said tube and above said baffle means, means for withdrawing a fraction of moderator from said tube by way of said outlet connection, means for passing said fraction through said cooling apparatus and means for returning said fraction to said tube by way of said inlet connection.

3. A nuclear reactor as claimed in claim 1, wherein the mass of moderator in each tube of said first group is heavy water and each of said tubes is provided with a pipe penetrating its upper end to extend downwardly into said mass of moderator, said pipe being perforated along the portion of its length adjacent the surface of the moderator, means for feeding a purging gas to the upper end of said pipe and means for withdrawing gas from above the surface of said mass of moderator.

4. A nuclear reactor comprising: a nest of close-spaced tubes disposed upright in parallel array and arranged in first and second groups, the first group comprising a relatively large number of tubes and the second group comprising a relatively small number of tubes, the tubes of the second group being distributed over the nest and separated from each other by tubes of the first group, nuclear fuel in the tubes of the second group only, a mass of liquid moderator in each of the tubes of the first group, and means causing a flow of reactor coolant to pass along each of the tubes of the second group and in heat exchange with said nuclear fuel, a plurality of the tubes of said first group having further tubes disposed lengthwise therein to define annular spaces wherein the moderator is contained, a reactor control rod disposed vertically above each of said further tubes, and means for moving said control rods into and out of said further tubes.

5. In a nuclear reactor of the kind wherein the reactor coolant and a liquid moderator are kept separate from each other by confining the moderator liquid to a liquid-tight structure and by confining the reactor coolant to a lattice of pressure-tight tubular channels extending through said structure and containing the reactor fuel, the improvement wherein said structure comprises a nest of close-spaced tubes disposed upright in parallel array and arranged in groups around said coolant-confining tubular channels, and a mass of liquid moderator within each of the tubes of said groups.

References Cited by the Examiner

UNITED STATES PATENTS

| | | | |
|---|---|---|---|
| 2,806,819 | 9/57 | Christy et al. | 176—44 |
| 2,816,068 | 12/57 | Ruano | 176—20 |
| 2,999,059 | 9/61 | Treshow | 176—42 |

FOREIGN PATENTS 1,055,140  4/59  Germany.

CARL D. QUARFORTH, *Primary Examiner.*

REUBEN EPSTEIN, ROGER L. CAMPBELL,
*Examiners.*